United States Patent [19]

Field et al.

[11] 3,907,720

[45] Sept. 23, 1975

[54] INSOLUBLE POROUS POLYMERIC IODINE COMPLEXES USEFUL AS BACTERICIDES

[75] Inventors: Nathan D. Field, Allentown; Earl P. Williams, Argyl, both of Pa.

[73] Assignee: GAF Corporation, New York, N.Y.

[22] Filed: Aug. 10, 1972

[21] Appl. No.: 279,731

Related U.S. Application Data

[63] Continuation of Ser. No. 875,516, Nov. 10, 1969, abandoned, which is a continuation-in-part of Ser. No. 736,302, June 12, 1968, abandoned.

[52] U.S. Cl.. 260/2.5 R; 260/29.6 HN; 260/33.4 R; 424/78
[51] Int. Cl............................................. C08d 13/08
[58] Field of Search........ 424/78; 260/80.3 N, 2.5 R

[56] References Cited
UNITED STATES PATENTS 3,235,490  2/1966  Goren............................. 260/80.3 N
3,423,381  1/1969  Merijan et al. ....................... 424/78

Primary Examiner—V. D. Turner
Attorney, Agent, or Firm—Walter C. Kehm

[57] ABSTRACT

Iodine complexes can be prepared of water-insoluble but water swellable cross-linked N-vinyllactam or N-alkyl-N-vinylamide polymers in the form of porous beads or granules. Such complexes are suitable as bactericide and water treatment aids in gravity filtration systems or packed columns, such aids having the advantage of rapid throughput. The complexes are prepared by reacting the cross-linked particulate polymeric material with elemental iodine either by a dry blending or iodine and polymer solids or by mixing of the porous polymer with a solution of iodine.

9 Claims, No Drawings

INSOLUBLE POROUS POLYMERIC IODINE COMPLEXES USEFUL AS BACTERICIDES

This application is a continuation of Ser. No. 875,516, filed Nov. 10, 1969, now abandoned, which is a continuation-in-part of application Ser. No. 736, 302 filed June 12, 1968, now abandoned.

The present invention is directed to certain novel polymeric-iodine complexes as well as methods of producing the same; more particularly, the present invention is directed to iodine complexes of water-insoluble but water swellable cross-linked N-vinyl lactam or N-alkyl-N-vinylamide polymers in the form of porous beads or granules.

For many years water-insoluble powders of polyvinyl pyrrolidone, similar lactams, and similar vinylamides were utilized for a variety of purposes including among others as filtering media in packed column and similar filtration purification systems. The powdered materials, however, are unsatisfactory in most instances because of the extremely long drainage time of liquid through the powder. Accordingly, it has long been the desire to provide an improved product which will eliminate such deficiency.

Co-pending application Ser. No. 736,302, filed June 12, 1968, describes such an improved product, the product being a cross-linded vinyl pyrrolidone or similar polymer in the form of highly porous beads which are water-insoluble but water swellable. As disclosed in such co-pending application, such novel cross-linked polymers have the advantage of good strength and rapid throughput in gravity or pressure filtration systems or packed column filtration operations.

In accordance with the present invention, it has been found that useful products can be prepared through the preparation of iodine complexes of such water-insoluble but water swellable cross-linked N-vinyllactam or N-alkyl-N-vinylamide polymers in the form of porous beads or granules. In this connection, it has been found in accordance with the present invention that such porous bead-iodine complexes are of special value in the treatment of water for swimming pools, etc., by the gradual slow release of iodine or for water purification purposes by passing a flow of water through a bed of the complex material.

Accordingly, it is a principal object of the present invention to provide for a novel product having characteristics not associated with any products of prior art.

It is further object of the present invention to provide as a novel product an iodine complex of a water-insoluble but water swellable cross-linked N-vinyllactam or N-alkyl-N-vinylamide.

It is yet a further object of the present invention to provide such novel iodine complexes in the form of porous beads or granules of good strength, such complexes being suitable for use as complexing agents in ordinary gravity or pressure filtration systems or packed columns, the complexes having the advantage of rapid throughput.

A still further object of the present invention relates to a method of producing such iodine complexes comprising reacting elemental iodine with the porous polymer solids either through dry blending or mixing the polymer with a solution of iodine.

Still further objects of the present invention will become more apparent from the following more detailed description thereof.

As indicated previously, the above objects and advantages of the present invention are achieved through the provision of novel iodine complexes of water-insoluble but water swellable cross-linked N-vinyl lactam or N-alkyl-N-vinylamide polymers.

The N-vinyl lactams employed in the preparation of the cross-linked polymers of the iodine complexes of the present invention are lactams corresponding to the general formula:

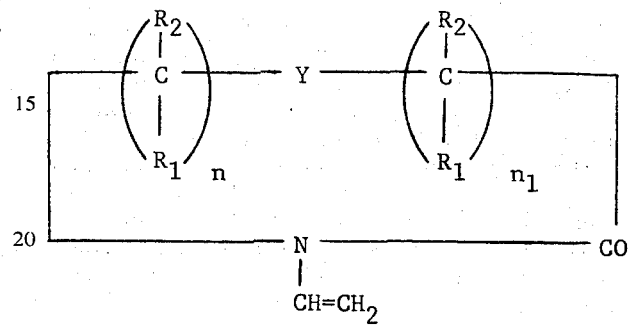

where $R_1$ and $R_1$ = hydrogen, alkyl and aryl

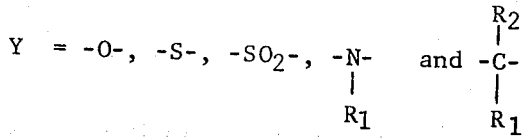

$n$ and $n_1$ range from 0 to 5 but where only one of the $n$ or $n_1$ values may be zero.

Such N-vinyl lactams are those which can be prepared, for example, by the vinylation of lactams such as disclosed in U.S. Pat. Nos. 2,891,058; 2,265,450; 2,335,454 and 3,097,087. Similarly, the N-vinyl lactams may be prepared in a known manner by N-vinylation of the corresponding lactams at elevated temperatures in a manner such as disclosed in U.S. Pat. No. 2,317,084. Accordingly, representative N-vinyl lactams operable in accordance with the present invention such as: N-vinyl-2-pyrrolidinone and N-vinyl-substituted derivatives of the following lactams: 3,3-dimethyl-2-pyrrolidone, 4,4-dimethyl-2-pyrrolidone, 3,4-dimethyl-2-pyrrolidone, 3-ethyl-2-pyrrolidone, 3,5-dimethyl-2-pyrrolidone, 3-phenyl-2-pyrrolidone, 4-acryl-2-pyrrolidone, 5-ethyl-2-pyrrolidone, 3-methyl-2-pyrrolidone, 4-methyl-2-pyrrolidone, 5-methyl-2-pyrrolidone, 3,3,5-trimethyl-2-pyrrolidone; 2-piperidone, 5,5-diethyl-2-piperidone, 5,6-dimethyl-2-piperidone, 4-ethyl-2-piperidone, 6-ethyl-2-piperidone, 6-ethyl-3-methyl-2-piperidone, 3-methyl-2-piperidone, 4-methyl-2-piperidone, 5-methyl-2-piperidone, 6-methyl-2-piperidone; 2-caprolactam, 3,6-dimethyl-2-caprolactam, 4,6-dimethyl-2-caprolactam, 4,7-dimethyl-2-caprolactam, 7,7-diethyl-2-caprolactam, 3-ethyl-2-caprolactam, 5-ethyl-2-caprolactam, 6-ethyl-2-caprolactam 7-ethyl-2-caprolactam, 4-ethyl-6-methyl-2-caprolactam, 6-ethyl-4-methyl-2-caprolactam, 3-methyl-2-caprolactam, 4-methyl-2-caprolactam, 5-methyl-2-caprolactam, 6-methyl-2-caprolactam; 2-oxizinidinone (e. g. U.S. Pat. Nos. 2,905,669 and 3,097,087), 5-ethyl-2-oxazinidinone, 5-phenyl-2-oxazinidinone, 4,5-dimethyl-2-oxazinidinone, 5,5-dimethyl-2-oxazinidinone, 2,5-diphenyl-2-oxazinidinone, 2-phenyl-4-oxothiazolidone, 2,2'-diphenyl-4-oxothiazolidone, 2,2'-dimethyl-4-oxothiazolidone; 2-oxazolidinone (deriv. in U.S. Pat. Nos. 2,905,690 and 2,891,058), 5-methyl-2-pxazolidinone, 4-methyl-2-oxazolidinone, 5-ethyl-2-oxazolidinone, 4,5-dimethyl-2-oxazolidinone, 2-phenyl-2-oxazolidinone, 5-butyl-2-oxazolidinone, 5-propyl-2-oxazolidinone, 4,5-diethyl-2-oxazolidinone; 3-morpholinone disclosed in U.S. Pat. No. 2,987,509 e. g. 5-methyl-3-morpholinone, 5-ethyl-3-morpholinone; 3,5-dimethyl-3-morpholinone; 2-piperazinone (e. g. JACS 62, 1202 (1940)), 2-methyl-4-thiazolidinone; 2-phenyl-4-thiazolidinone; 2-phenyl-4-thiazolidinone dioxide; 2-thiazolidone (J. Chem. Soc. 1949, 2367); 3-thiamorpholinone; 2-pyrimidone (e. g. J. Chem. Soc. 1959,525); 2-imidazolidones (e. g. Ann. 232, 1222 (1885)); N,N-ethylene-thioureas (e. g. J. Biol. Chem. 163, 761 (1946)); tetra-hydro-(2H, 1, 3)-oxazin-3-ones (e. g. U.S. Pat. No. 2,940,971), and the like.

Similarly, suitable N-alkyl-N-vinylamides useful in accordance with the present invention are those which correspond to the formula:

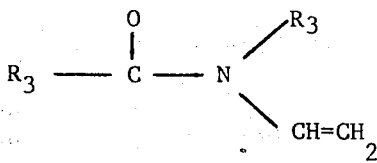

wherein $R_3$ is independently selected from the class of hydrocarbon radicals of 1 to b 4 carbon atoms preferably 1 to 2 carbon atoms.

Such N-alkyl-N-vinylamides are illustrated in U.S. Pat. No. 3,214,370, exemplary amides being: N-alkyl-N-vinylamides include N-methyl-N-vinylacetamide, N-ethyl-N-vinylacetamide, N-butyl-N-vinylacetamide N-methyl-N-vinylpropionamide, N-methyl-N-vinylpentanoic acid amide, N-methyl-N-vinylformamide and the like.

In preparing the porous granular or porous bead form of polymer in accordance with the present invention, the N-vinyl lactam or N-alkyl-N-vinylamide, with or without a further copolymerizable monomer and with a cross-linking agent as to be hereinafter defined, is polymerized in a manner described in co-pending application Ser. No. 736,302, subject matter for the preparation of a cross-linked polymer of N-vinyl pyrrolidone as granules or beads being covered in the continuation-in-part application Ser. No. 131,434 filed Apr. 5, 1971 now U.S. Pat. No. 3,689,439. In this connection, as defined in such co-pending application the porous granular or bead form of the polymer is produced from a suspension polymerization system wherein the lactam or amaide monomer with optional copolymerizable monomer and corss-linking agent is polymerized in an aqueous solution of an electrolyte, the suspension being maintained during polymerization by mechanical means. In such polymerization process a free radical polymerization source is utilized.

In this regard, the preparation of the porous bead or granular form of polymer involved the polymerization of the N-vinyl lactam or N-alkyl-N-vinylamine with an amount of cross-linking agent i. e., divinyl monomer within the range of about 0.1% to about 20% by weight based on the weight of the N-vinyl lactam or N-alkyl-N-vinylamide. Such polymerization is carried out in an aqueous solution of an electrolyte, the concentration of electrolyte being high enough to produce phase separation before or during polymerization. In this regard, a preferred electroyte solution contains from about 10% to about 20% sodium sulfate. Since the monomers polymerized in accordance with this procedure are not very soluble in such electrolyte solutions, by using more than enough monomers to saturate the solution of electrolyte a suspension of the excess monomers can be made through mechanical agitation. In this connection, the use of excess undissolved salt is often beneficial since the solid becomes enmeshed in the bead or granule and upon dissolution increases the surface area of the porous product.

In the polymerization process, the relative proportion of the total monomer to water is determined at the upper limit by the ability of heat removal and the danger of particle agglomeration, this upper limit being as high as about 80% monomer, preferably about 50% monomer based upon the weight of the water. The lower limit is inter alia based on convenience of operating without undue bulk, the process of the present invention being capable of being carried out successfully with as low as 1% monomer, preferably 10% monomer based on the weight of the water in the aqueous electrolyte system.

As indicated preveiously, the polymerization process is conducted in the presence of a catalyst which provides a source of free radicals. In this respect, any of the conventional free radical initiator catalysts generally employed in vinyl polymerizations can be employed in accordance with the process of the present invention, such catalysts being added either to the mixture of monomers polymerized in accordance with the present invention or to the aqueous solution of electrolyte. Thus, for example, the catalyst can comprise any of the conventional peroxide, as well as the preferred azo catalysts e.g. azobisisobutyronitrile.

The cross-linking agents which are suitably employed in the preparation of the porous bead or granular form of polymer in accordance with the present invention are those which contain two or more functional groups capable of taking part in the polymerization reaction so as to provide a polymeric product having a cross-linked or three dimensional structure.

Accordingly, suitable cross-linking agents that have been found particularly applicable in accordance with the present invention are the alkylenebisacrylamides, e.g. N,N'-methylenebisacrylamide, the alkylene glycol dimethacrylates, e.g. ethylene glycol dimethacrylate, diethylene glycol dimethacrylate, tetraethylene glycol dimethacrylate, higher polyethylene glycol dimethacrylate, 1,3- and 1,4- butanediol diacrylates and dimethacrylates, etc. and the divinyl aromatic compounds, e.g. divinyl benzene, divinylethylbenzene, divinylchlorobenzene, divinyltoluene, divinyl naphthalene, etc. Other suitable cross-linking agents include allyl acrylate, p-isopropenylstyrene, trivinyl trimesate, diallyl maleate, divinyl ether, 1,3- or 1,4 divinyl oxybutane, trivinyl citrate, divinyl o-phenylene diacetate, vinyl allyl ether, diethylene glycol diallyl ether, trivinyl glyceryl ether, divinyl glyceryl ether, tetravinyl pentaerythrityl ether, hexahydro-1,3,5-triacryl-s-triazine, vinylpyrrolidone dimers described in U.S. Pat. No. 3,252,995, and the like. Of course, mixtures of the above-cited suitable cross-linking agents can be advantageously employed where desired.

As indicated above, the cross-linking agent is generally employed in an amount of from about 0.1% to about 20% by weight based upon the weight of the N-vinyl lactam or N-alkyl-N-vinylamide monomer. An amount of from about 3% to about 5% of the cross-linking agent is preferred.

Similarly, as indicated above, the N-vinyl lactam or N-alkyl-N-vinylamide can be polymerized in the presence of an optional copolymerizable monomer. Preferably such copolymerizable monomer should be present in an amount of less than about 50% by weight based on the weight of the N-vinyl lactam or N-alkyl-N-vinylamide monomer, and more preferably, in an amount of less than about 20% by weight.

Examples of comonomers which can be employed are the N-vinyl lactams of N-alkyl-N-vinylamides listed above, or acrylates, e.g. methyl, ethyl, propyl and higher alkyl, phenyl, naphthyl and other aryls; $\alpha$-substituted acrylates such as $\alpha$-methyl, ethyl, propyl and higher alkyl, phenyl, naphthyl and other aryls; vinyl ethers, e. g.. methyl, ethyl, propyl and higher alkyls, acrylamide, acrylic acid, acrylonitrile, allyl acetate, allyl alcohol, crontonic acid, dimethylaminoethylvinyl sulfide, diethylhexyl maleate, didodecyl maleate, fumaramide, itaconic acid, methacrylic acid, methacrylamide, methoxy styrene, methyl vinyl ketone, methyl vinylpyrrolidone, 2-methyl-5-vinylpyridine, styrene, trichloroethylene, vinyl carbazole, vinylimidazole, vinyl laurate, vinyl methyl benzimidazole, vinyl methyl dichloro silane, vinyl methyl oxazolidinone, vinyl oxyethylurea, vinyl propionate, vinyl pyridine, vinyl siloxanes, vinyl stearate, vinyl acetate (and the derived vinyl alcohol).

It is noted that a further description of the production of the cross-linked particulate polymeric N-vinyl lactam polymers and copolymers and N-alkyl-N-vinylamide polymers and copolymers in the form of porous beads or granules can be found in co-pending application Ser. No. 736,302. Thus, for example, the polymerization process may be carried out by adding all of the monomers to the salt solution in one charge or such monomers may be added in portions or continuously during the polymerization. The polymerization is usually carried out at about 5° to 80°C. and requires a relatively short time for completion, e.g., about 2 to 6 hours. Accordingly, the disclosure of co-pending application Ser. No. 736,302 as it pertains to the production of the water-insoluble but water swellable cross-linked polymers employed in the process of the present invention is herein incorporated by reference.

As indicated previously, the iodine complexes of the present invention are obtained by combining elemental iodine with the porous beads or polymer granules either by dry blending of iodine with the polymer solids or by mixing of the polymer with a solution of iodine. When employing a solution of iodine, it is either necessary to add a solubilizing agent to an aqueous medium since the iodine is not very soluble in water or to use an oragnic solvent, e. g., a lower alkanol such as ethanol. Thus, for example, since the solubility of free iodine in water is only 0.335 grams per liter the use of a solubilizing agent such as potassium iodide allows for the preparation of a solution which can be employed in the complexing reaction of the present invention.

In preparing the iodine complexes of the present invention the elemental iodine or a solution of iodine with or without a solubilizing agent and porous beads or polymer granules are mixed at a temperature ranging from room temperature to an elevated temperature of 100°C or more. Generally, the reaction of the polymer with the iodine takes place over a fairly prolonged period of time, i. e., from about 2 hours to about 2 weeks or longer. After the reaction of the iodine with the polymer is completed, the excess iodine crystals or solution is removed and the porous polymer beads or granules dried to produce the final complex products of the present invention.

In accordance with the present invention the iodine complex contains from about 2% to about 40% by weight of available iodine, generally, from about 5% to about 30% by weight of the available iodine.

The novel product and process of the present invention will now be described by the following specific examples.

EXAMPLE 1

Part A

Into a 3 liter resin flask equipped with thermometer, stirrer, gas inlet, dropping funnel and condenser connected to gas outlet was charged: 400.0 g. distilled vinylpyrrolidone, 0.8 azobisisobutyronitrile (Dupont-Vazo), 1600.0 g. distilled water, 16.0 g. methylenebisacrylamide (Cyanamid), 6.0 g. 10% weight solution $Na_2HPO_4$ and 300.0 g. anhydrous sodium sulfate. Air was removed by closing the gas inlet and applying enough vacuum at the gas outlet to cause violet ebullition for 30 seconds. The vacuum was then released by allowing nitrogen to enter the gas inlet. This procedure was repeated two more times and then a positive pressure of nitrogen was maintained by connecting the gas outlet to a mineral oil blow-out by having a depth of 1 inch of oil. The flask was heated with stirring in a constant temperature bath for 1 ½ hours at a reaction temperature of 50° to 85°C. At the end of this time a solution of 0.4 g. azobisisobutyronitrile (Vazo), 4.0 g. methylenebisacrylamide (Cyanamid), 30.0 ml. C. P. ethanol and 30.0 ml. distilled water were changed to the dropping funnel and the air removed by violent ebullition and replaced with nitrogen. This procedure was repeated two more times by suitable adapters connected to the dropping funnel. This solution was then added to the contents of the flask and the heating continued for 2 additional hours at 70°–75°C. At the end of this time the beads were filtered and washed with water. The wet beads weighed 1985 grams. A 100 gram portion of the wet beads after drying in a high vacuum oven at 75°C weighed 19.3 grams (91.2% yield)

Part B

Some 800.0 g. of the above wet beads were then slurried for one hour in 1600.0 ml. of a 1:1 mixture of C. P. methanol-water and finally washed free of methanol with distilled water. A 56.0 g. portion of the wet beads after drying in a vacuum oven for 3 days at 50°C weighed 9.7 grams (17.3% solids). Then 17.3 g. of the above methanol-water washed beads (17.3% solids) were slurried for 20 minutes in 150.0 ml. of 0.1045 N iodine solution. The 0.1 N iodine solution was previously prepared by dissolving 12.7 g. C. P. iodine and 60.0 g. C. P. potassium iodide in 75 ml. water. When the iodine had dissolved the solution was diluted to 1 liter with water. The standardization of the iodine solution was made using 0.1021 N $Na_2S_2O_3$ to a starch indicator end point. (The 150 ml. charged was introduceed by pipette) After slurring for 20 minutes, a 50 ml. aliquot of the iodine solution was drawn off from the beads and titrated with 0.1021 N $Na_2S_2O_3$ to the starch indicator end point. It was found that by $Na_2S_2O_3$ titration of the iodine solution to starch output that 1.5 g. iodine was absorbed by 2.993 g. polymer solids.

EXAMPLE 2

Part A

Into a 2 gallon stainless steel autoclave was charged: 660.0 g. distilled vinylpyrrolidone, 2.64 ml. azobisisobutyronitrile (Du Pont - Vazo), 33.0 g. Dow divinylbenzene-55. A mixture of isomers of divinylbenzene, ethyl vinylbenzene, and diethylbenzene. Typical chemical analysis: 55.0% total divinylbenzene, 25% meta ethylvinylbenzene, 13% para ethylvinylbenzene. 2150.0 g. distilled water and 570.0 g. anhydrous sodium sulfate. A vacuum was applied to cause ebullition of air from the solution and then released with nitrogen. This procedure was repeated two more times. The contents of the autoclave were then heated to 65°C and held at this temperature for 2 additional hours. The slurry of beads was cooled to 75°C and 1 liter C.P. ethanol was added and stirred for one half hour. At the end of this time the beads was filtered and washed free of sulfate ion (a sample of the filtrate showed a negative test with a $BaCl_2$ solution). The wet beads weighed 2928 grams. A 100 g. portion after drying in a vacuum oven at 70°C weighed 18.5 grams.

Part B

Some 372.0 g. of the above wet beads (18.5% solids or 68.8 g. dry wt) were changed to a 30 mm. glass column and backwashed with a steady stream of distilled water to remove trapped air. The beads after washing and allowing to settle occupied a height of 24 inch in the column. A 0.01 N iodine solution (made up as in Example 1 and diluted ten fold with water) was then passed through the column by means of a constant head device at a rate of 20 ml./minute while collecting the effluent in a 2 liter receiver containing starch indicator. A total of 28.82 liters of 0.01 N iodine was passed into the column before any iodine was noted in the effluent.

Part C

The reversible nature of the iodine complex was then demonstrated by changing 105.5 g. of the above iodine treated beads (22% solids after drying) to an 18 mm. diameter column and backwashing as before. After washing and allowing to settle the beads occupied a height of 26 inch. Distilled water was charged to the constant head device and passed through the column at a rate of 20 ml/minute. The effluent was collected in 2 liter portions and titrated for the amount of available iodine by titration with 0.0985 N $Na_2S_2O_3$ to a starch end point. Then 65.39 liters of distilled water were passed through the column before the available iodine was exhausted as determined by the starch end point. Some 351.4 ml. of .0985 N $Na_2S_2O_3$ were required to tiltrate the iodine in the total effluent.

EXAMPLE 3

Part A

Some 18.5 g. dry beads prepared in a manner similar to Part A, Example 2, and previously extracted with C. P. methanol in a Soxhlet extractor and again dried (93% insoluble) were mixed for 4 ½ hours with 1.6 g. distilled water in a ceramic ball mill. The water was absorbed and the beads remained hard. 3.3 g. C.P. iodine crystals were then added and ball milled for 18 hours at room temperature and then heated in an oven at 75°C for 24 hours. No weight loss was detected. The hard beads were an even brown color.

A 1.935 g. sample of the above iodine complexed beads were rotated for 18 hours in 50.0 ml. 0.1000 N $Na_2S_2O_3$ solution. At the end of this time a 20.0 ml. aliquot was removed and titrated with 0.1075 N iodine solution to a starch end point to determine the excess $Na_2S_2O_3$. It was found that the porous beads contained 8.0% available iodine.

Part B

In this manner similar to Example 3, Part A, 19.5 g. dry beads prepared in a manner similar to Part A, Example 2, and previously extracted with C. P. methanol in a Soxhlet extractor and again dried (99% methanol insoluble) were mixed for 3 hours with 4.9 g. distilled water in a ceramic ball mill. The water was absorbed and the beads remained hard. Then 3.5 g. C. P. iodine crystals were added and ball milled for 18 hours at room temperature and then heated in an oven at 75°C for 24 hours. The hard beads were an even black color. Titration of a sample using the procedure of Example 3, Part A found 11.9% available iodine in these beads.

EXAMPLE 4

Prep. in water without potassium iodide

Some 38.0 g. wet beads (20% solids) prepared in a manner similar to Example 2, Part A, 38.0 g. distilled water and 2.2 g. C. P. iodine crystals were changed to a container and allowed to rotate at room temperature for 58 days. Not all of the iodine had dissolved after 28 days. The beads were then filtered, washed and dried under high vacuum at room temperature. The dry weight was 9.6 g. A sample of the beads titrated as in Example 3, Part A showed that the available iodine content was 18.2%.

EXAMPLE 5

Prep. in Ethanol-Water Without Potassium iodide

In a manner similar to Example 4, 38.0 g. wet beads (20% solids) prepared as in Example 2, Part A, 19.0 g. distilled water 19.0 g. C. P. ethanol and 2.2 g. C. P. iodine crystals were rotated at room temperature for 58 days. Iodine required at least 2 days to dissolve. After filtration, washing and drying the beads weighed 9.9 grams. Titration similar to Example 3, Part A found the available iodine content to be 17.0%.

EXAMPLE 6

Prep. Using 7 moles potassium iodide per mole iodine for rapid solubility of iodine Some 372.0 g. wet beads (18.5% solids) prepared as in Example 2, Part A were mixed for 16 hours at 30°C with a solution of 0.1 N iodine prepared as follows: 35.5 g. C. P. iodine crystals, 168.0 g. C. P. potassium iodide were slurried to dissolve in 210.0 g. distilled water. After solution was complete, 2400.0 g. distilled water were added. The pH of the solution before addition of beads was 7.5. At the end of the 16 hour mixing the pH was 6.4. The wet filtered beads weighed 318 grams. A 25.5 g. portion dried for 4 days under high vacuum at 30°C weighed 9.8 grams (38.4% solids). Titration of a sample similar to Example 3, Part A showed the available iodine content to be 26.0%.

EXAMPLE 7

Prep. Using 1 mole potassium iodide per mole iodine

Some 100.0 g. wet beads (18.5% solids) prepared in a manner similar to Example 2, Part A, 9.5 g. C. P. iodine crystals, 6.1 g. C. P. potassium iodide and 215.0 g. distilled water were rotated in a container for 3 days until all iodine had dissolved. After filtration, washing and air drying the black beads weighed 27.7 grams. Titration of a sample similar to Example 3, Part A showed the available iodine content to be 27.2%.

EXAMPLE 8

Prep. Using 2 moles potassium iodide per mole iodine

Example 7 was repeated except twice as much potassium iodine (12.2 g) was used and the bottle rotated for 2 days until all iodine had dissolved. The dry weight of product was 26.4 grams. The available iodine content was 26.8%.

EXAMPLE 9

Prep. Using 3 moles potassium iodide per mole iodine

Example 7 was repeated except three times as much potassium iodide (18.3 g.) was charged and the bottle rotated for 24 hours during which time all of the iodide had dissolved. The dry weight of product was 26.7 g. The available iodine content was 27.0%.

EXAMPLE 10

Prep. Using 0.5 mole potassium iodide per mole iodine in slurry containing minimum amount of water necessary for stirring of beads Some 100.0 g. wet beads (18.5% solids) prepared in a manner similar to Example 2, Part A were stirred in a flask containing 9.5 g. C. P. iodine, 3.0 g. potassium iodide and 40.0 g. distilled water. After 18 hours the beads were washed and filtered 4 times with 400 ml. portions of distilled water. The air dried beads weighed 28.2 grams. The available iodine content was 28.1%.

EXAMPLE 11

Prep. Using Beads Containing 99 parts vinylpyrrolidone with 1 part acrylamide cross-linked with divinylbenzene (Exp. 6216-11, 6286-294)

Part A: Prep. of Beads

Into a 1 liter stainless steel autoclave equipped with a 4 blade turbine stirrer were charged 118.8 g. vinylpyrrolidone, 1.2 g. acrylamide (Amer. Cyanamid), 390.0 g. distilled water, 0.4 g. 10% weight solution $Na_2HPO_4$, 0.5 g. azobisisobutyronitrile (Du Pont-Vazo), 6.0 g. Dow divinylbenzene - 55 mixture and 105.0 g. anhydrous sodium sulfate. The vessel was purged of air with nitrogen and heated to 90°C and held for 3 hours at this temp. (psig 8 lbs.). After washing free of sulfate ion the moist beads weighed 497 grams. A 50.0 gram portion after drying weighed 12.0 grams (24% solids) (94.7% yield small uniform beads.)

Part B: Prep. Using 0.17 mole potassium iodide per mole iodine in slurry containing minimum amount of water necessary for stirring of beads Then 9.5 g. C. P. iodine crystals, 1.0 g. C. P. potassium iodide and 50.0 g. distilled water were stirred together. To this was added 77.1 g. wet beads prepared in a manner similar to Example 11, Part A (24% solids or 18.5 g. dry basis). After rotation in a container for nine days at room temperature a small amount of iodine remained undissolved. The beads were decanted from the iodine crystals and washed four times with 300 ml. distilled water. After air drying the beads weighed 25.7 grams. Titration for available iodine showed 23.5%.

EXAMPLE 12

Demonstration of Bonding of Iodine In a Complex Form

Some 1.0 g. iodine complex beads prepared and dried as in Example 6, and 10.0 ml. C. P. carbon tetrachloride were rotated together in a container for 24 hours. The $CCl_4$ remained clear water white. No iodine was extracted by this solvent from the bead complex.

EXAMPLE 13

Example 2 was repeated except for the use of N-vinyl-2-oxazolidone instead of N-vinyl-2-pyrrolidone.

EXAMPLE 14

Example 2 was repeated except for the use of N-vinyl-caprolactam instead of N-vinyl-2-pyrrolidone.

EXAMPLE 15

Example 2 was repeated except for the use of N-vinyl-2-piperidone instead of N-vinyl-2-pyrrolidone.

EXAMPLE 16

Example 2 was repeated except for the use of N-vinyl-3-morpholinone instead of N-vinyl-2-pyrrolidone.

EXAMPLE 17

Example 2 was repeated except for the use of N-methyl-N-vinylacetamide instead of N-vinyl-2-pyrrolidone.

We claim:

1. An iodine complex of a water-insoluble but water-swellable crosslinked polymer of N-vinyllactam of N-lower alkyl-N-vinylamide monomer and about 0.1 to about 20% by weight of a crosslinking agent containing at least two functional groups capable of taking part in the polymerization reaction, said crosslinking agent being selected from the group consisting of alkylenebisacrylamides, alkylene glycol dimethacrylates, divinylbenzene, divinyl ethylbenzene, divinylchlorobenzene, divinyltoluene, divinylnaphthalene, allyl acrylate, p-isopropenylstyrene, trivinyl trimesate, diallylmaleate, divinyl ether, 1,3-divinyl oxybutane, 1,4-divinyl oxybutane, trivinyl citrate, divinyl o-phenylene diacetate, vinyl allyl ether, diethylene glycol diallyl ether, trivinyl glyceryl ether, divinyl glyceryl ether, tetravinyl pentaerythrityl ether, hexahydro-1,3,5-triacyl-s-triazine and vinylpyrrolidone dimer, said polymer being in the form of porous beads or granules and said complex containing from about 2 to about 40% available iodine.

2. The iodine complex of claim 1 wherein said complex contains from about 5 to about 30% available iodine.

3. The iodine complex of calim 1 wherein said N-vinyl lactam monomer is N-vinyl pyrrolidone.

4. The iodine complex of claim 1 wherein said polymer additionally contains a different polymerizable monomer in an amount of less than 501 % by weight based on the weight of the N-vinyllactam or N-alkyl- N-vinylamide monomer, which different polymerizable monomer is selected from the group consisting of N-vinyllactam, N-loweralkyl-N-vinylamide, acrylates, vinyl ethers, acrylamide, acrylic acid, aacrylonitrile, allyl acetate, allyl alcohol, crontonic acid, dimethylaminoethylvinyl sulfide, diethylhexylmaleate, didocecyl maleate, fumaramide, itaconic acid, methacrylic acid, methacrylamide, methoxystyrene, methylvinyl ketone, methylvinylpyrrolidone, 2-methyl-5-vinylpyridine, styrene, trichloroethylene, vinylcarbazole, vinylimidazole, vinyllaurate, vinylmethylbenzimidazole, vinylmethyldichlorosilane, vinylmethyloxazolidinone, vinyloxyethylurea, vinylpropionate, vinylpyridine, vinylsiloxane, vinylstearate, vinylacetate and the vinyl alcohol derivative thereof.

5. A method of producing a polymer-iodine complex according to claim 1 which comprises reacting at a temperature ranging from room temperature up to 100°C., under agitation, a crosslinked polymer of N-vinyllactam or N-lower alkyl-N-vinylamide monomer and about 0.1 to about 20% by weight of at least one crosslinking agent containing at least two functional groups capable of taking part in the polymerization reaction, selected from the group consisting of alkylenebisacrylamides, alkylene glycol dimethacrylates, divinylbenzene, divinyl ethyl benzene, divinyl chlorobenzene, divinyl toluene, divinyl naphthalene, allyl acrylate, p-iospropenylstyrene, trivinyl trimesate, diallyl maleate, divinyl ether, 1,3-divinyl oxybutane, 1,4-divinyl oxybutane, diethylene glycol, diallyether, trivinyl glyceryl ether, trivinyl citrate, divinyl o-phenylene diacetate, vinyl allyl ether, divinyl glyceryl ether, tetravinyl pentaerylthrityl ether, hexahydro-1,3,5-triacyl-s-triazine and vinylpyrrolidone dimer, said polymer being in the form of porous beads or granules with sufficient elemental iodine and for a time sufficient to produce a complex containing from about 2 to about 40% available iodine and recovering the complex thereby formed.

6. The method of claim 5 wherein said elemental iodine is blended and mixed with said polymer in a solid form.

7. The method of claim 6 wherein a solution of elemental iodine is mixed with said polymer.

8. The method of claim 7 wherein said solution of iodine comprises a solution of elemental iodine in a lower alcohol solvent.

9. The method of claim 8 wherein said solution of iodine additionally comprises an aqueous solution containing potassium iodide as solubilizing agent.

* * * * *